United States Patent
Park

(10) Patent No.: US 6,933,990 B2
(45) Date of Patent: Aug. 23, 2005

(54) LIQUID CRYSTAL DISPLAY WITH A HEAT SHIELD BETWEEN THE INVERTER AND THE BACKLIGHT ASSEMBLY

(75) Inventor: Sang-Hoon Park, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 239 days.

(21) Appl. No.: 10/145,726

(22) Filed: May 16, 2002

(65) Prior Publication Data

US 2003/0007109 A1 Jan. 9, 2003

(30) Foreign Application Priority Data

May 18, 2001 (KR) .......................................... 2001-27196

(51) Int. Cl.[7] .......................................... G02F 1/1333
(52) U.S. Cl. .............................. 349/59; 349/58; 362/31
(58) Field of Search ........................ 349/58, 59; 362/31

(56) References Cited

U.S. PATENT DOCUMENTS 6,243,261 B1 * 6/2001 Janik et al. ................. 361/687
6,330,045 B1 * 12/2001 Tanaka ........................ 349/58
6,515,857 B2 * 2/2003 Ford et al. .................. 361/687

* cited by examiner

Primary Examiner—Tarifur R. Chowdhury
(74) Attorney, Agent, or Firm—McGuireWoods LLP

(57) ABSTRACT

There is disclosed a liquid crystal display (LCD) device that prevents degeneration of a displaying performance due to heat generated in the LCD. A heat shielding thin film of an aluminum-contained material, which is disposed in a receiving container, shields the heat additionally generated during a converting process of power for driving a lamp in an inverter module, thereby minimizing the heat to be transferred to a reflector panel. Therefore, the heat generated during a process of producing light is efficiently blocked and discharged, thereby minimizing the degeneration of displaying characteristic.

27 Claims, 14 Drawing Sheets

LIQUID CRYSTAL DISPLAY WITH A HEAT SHIELD BETWEEN THE INVERTER AND THE BACKLIGHT ASSEMBLY

BACKGROUND OF THE INVENTION

1. Field of the Invention

The present invention relates to a liquid crystal display (LCD), and more specifically, to a heat shielding film for preventing deformation of a reflecting plate and characteristic degeneration of liquid crystal due to heat generated from an inverter for driving a lamp that emits light necessary for a displaying operation and thus preventing partial or entire degeneration of displaying performance, and an LCD using the same.

2. Description of the Related Art

Generally, an LCD is defined as one of a flat panel display for displaying a desired character, image and moving picture using a physical and optical characteristic of liquid crystal.

The LCD performs a displaying operation in a digital control method—in contrast with a conventional CRT (cathode ray tube) type display that performs the displaying operation in an analog control method. This offers an advantage of less weight and volume than the CRT type display even though the LCD has the same resolution and displaying surface area as the CRT.

However, in the LCD, the liquid crystal that plays a conclusive role in performing the displaying operation cannot emit light by itself. Therefore, the LCD has a disadvantage in that it is impossible to perform the displaying operation unless the light is externally supplied, even through the liquid crystal is precisely controlled.

In the LCD, natural light or artificial light generated by consuming electric energy charged therein is primarily used as the light that is essential for performing the displaying operation.

Currently, the LCD using natural light has a fatal defect in that It is impossible to perform the displaying operation in a location that does not have enough natural light. Therefore, recently, the LCD using the artificial light generated by consuming the electric energy has been actively developed and used.

A CCFL (cold cathode fluorescent lamp) type lamp is mainly used as a light source for the LCD that uses artificial light. The CCFL type lamp generates white light that is close to natural light, and generates less heat and provides a longer life span. Although the CCFL type lamp has these advantages, however, since the lamp requires a very high driving voltage, it Is impossible to drive the lamp with only the low voltage used for controlling the liquid crystal of the LCD.

Therefore, the LCD needs an inverter including an IC device and a transformer for boosting a lower voltage to a high voltage that is required to drive the CCFL type lamp. Since the inverter is generally formed on a printed circuit board, it is impossible to dispose the inverter at a side portion of the thin LCD. Therefore, the inverter is generally disposed at a rear face of the LCD adjacent to the CCFL type lamp.

However, when the inverter is disposed at the rear face of the LCD, as described above, the display quality degrades seriously at a screen portion of the LCD corresponding to the inverter. The problem is caused by an operating characteristic of the inverter.

In concrete terms, the transformer as a core portion of the inverter generates excessive heat during the boosting operation, and the IC device also generates excessive heat during a data processing operation. The heat generated from the inverter is transferred to a reflector panel. The LCD is contained in a receiving container and the heat directly influence the reflector panel Also, the heat indirectly generates a humming in a light guiding plate and an optical sheet stacked on an upper face of the reflector panel, further influencing the liquid crystal of an LCD panel assembly.

Currently, the receiving container is formed with an opening at a bottom face thereof within an area that does not influence the strength thereof to reduce the weight of the LCD. The heat generated from the inverter, both directly and locally, heats the reflector panel through the opening.

If a portion of the reflector panel is locally heated, thermal expansion of the heated portion of the reflector panel is greater than that of a non-heated portion of the reflector panel. Therefore, the reflector panel is extended, and a surface of the reflector panel is thus expanded.

If the surface of the reflector panel is expanded as described above, a reflecting characteristic of the expanded portion of the reflector panel is different from that of a remaining portion of the reflector panel. As the result, as shown in FIG. 1, a dark space 1 is generated on a screen 10 opposite to the inverter (not shown).

If the heat generated from the inverter is exerted for an extended time on the reflector panel, the Light guiding plate, optical sheets and LCD panel assembly, another problem arises, that is, lowering the optical characteristic according to the local expansion of the light guiding plate, the optical sheets as well as the reflector panel.

Moreover, in the case where the heat generated from the inverter module heats the liquid crystal of the LCD panel assembly, the liquid crystal (having a middle characteristic between a liquid medium and a solid medium) has a characteristic inclined to the liquid medium. Therefore, another critical problem develops in that an inherent function of the liquid crystal is lost, so that the displaying operation can no longer be performed.

The problems generated at the inverter as described above became more serious since a displaying surface area of the LCD has been increased recently. This is caused because the wider the displaying surface area is the longer the lamp becomes, and also a driving voltage of the lamp is increased according to an increase in the length of the lamp, thereby generating more heat at the inverter, Therefore, in order to realize a large-sized LCD, it is required that the heat generated from the inverter does not exert an influence on all constructing elements of the LCD.

SUMMARY OF THE INVENTION

Therefore, it is an object of the present invention to rapidly discharge heat generated from an inverter and, at the same time, to block the heat so as not to exert an influence on all constructing elements of an LCD.

It is another object of the present invention to rapidly discharge and block a large amount of heat generated from the inverter even though the display area of the LCD increases.

It is further another object of the present invention to rapidly discharge heat generated from the inverter so as not to exert an influence on all constructing elements of an LCD and also to rapidly remove leakage current generated from the inverter.

To achieve the aforementioned objects of the present invention, there is provided an LCD in which an LCD panel assembly controls a liquid crystal to display an image. A backlight assembly is provided with a lamp assembly, for supplying light to the LCD panel assembly, and a light uniformity-enhancing module, for improving uniformity of the light generated from the lamp assembly. A receiving container receives and fixes the LCD panel assembly and the backlight assembly. An inverter is disposed at an outer surface of the receiving container to supply power needed to drive the lamp assembly. A heat shielding means is disposed at the receiving container, corresponding to a portion between the inverter and the receiving container so as to intercept heat generated from the inverter and to prevent the heat from being transferred to the light uniformity-enhancing module.

According to another aspect of the present invention, there is provided an LCD in which an LCD panel assembly controls a liquid crystal to display an image. A backlight assembly is provided with a lamp assembly, for supplying light to the LCD panel assembly, and a light uniformity-enhancing module, for improving uniformity of the light generated from the lamp assembly. A receiving container receives and fixes the LCD panel assembly and the backlight assembly. A conductive chassis prevents the LCD panel assembly from being separated from the outside. An inverter is disposed at an outer surface of the receiving container to supply power needed to drive the lamp assembly. A heat shielding means shields heat generated from the inverter and prevents the heat from being transferred to the light uniformity-enhancing module. A ground member electrically connects the inverter and the heat shielding means.

BRIEF DESCRIPTION OF THE DRAWINGS

The above objects and other advantages of the present invention will become more apparent by describing in detail preferred embodiments thereof with reference to the accompanying drawings in which.

DETAILED DESCRIPTION OF THE PREFERRED EMBODIMENTS

Now, preferred embodiments of the present invention will be described in detail with reference to the accompanying drawings.

Figure 1:
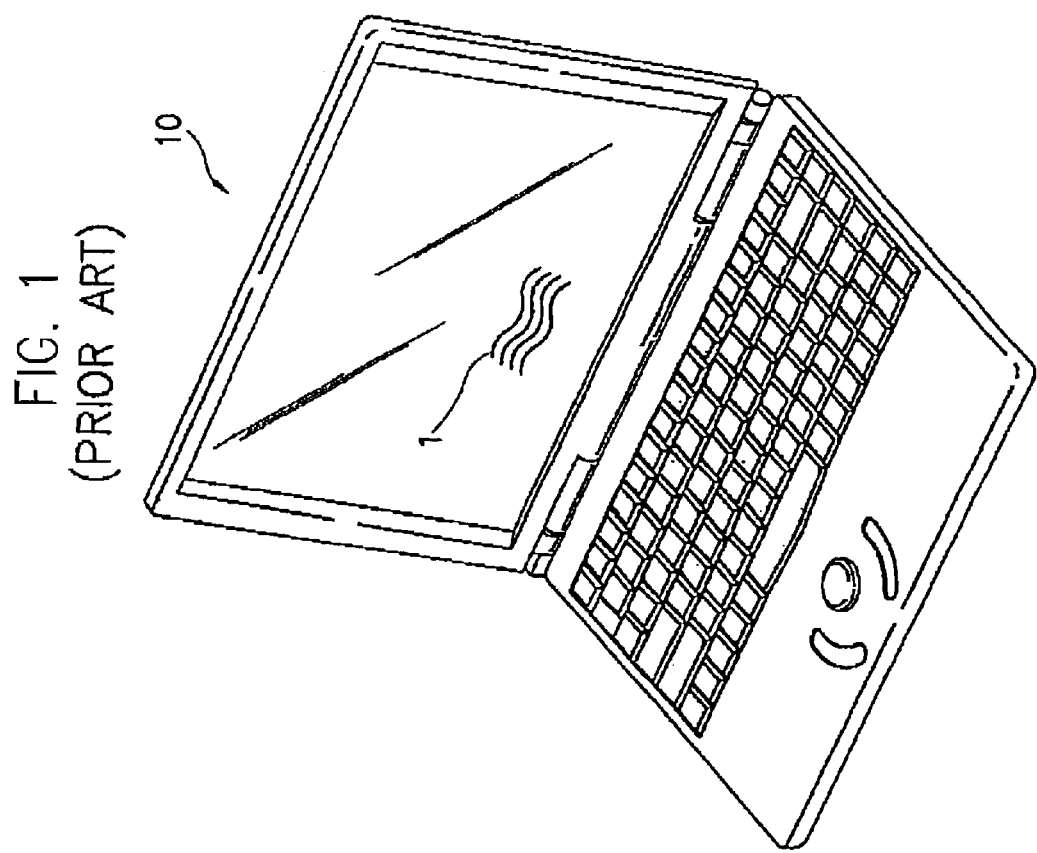
FIG. 1 is a view showing a state in which a displaying characteristic is lowered by heat generated from an inverter of a conventional LCD.
Figure 2:
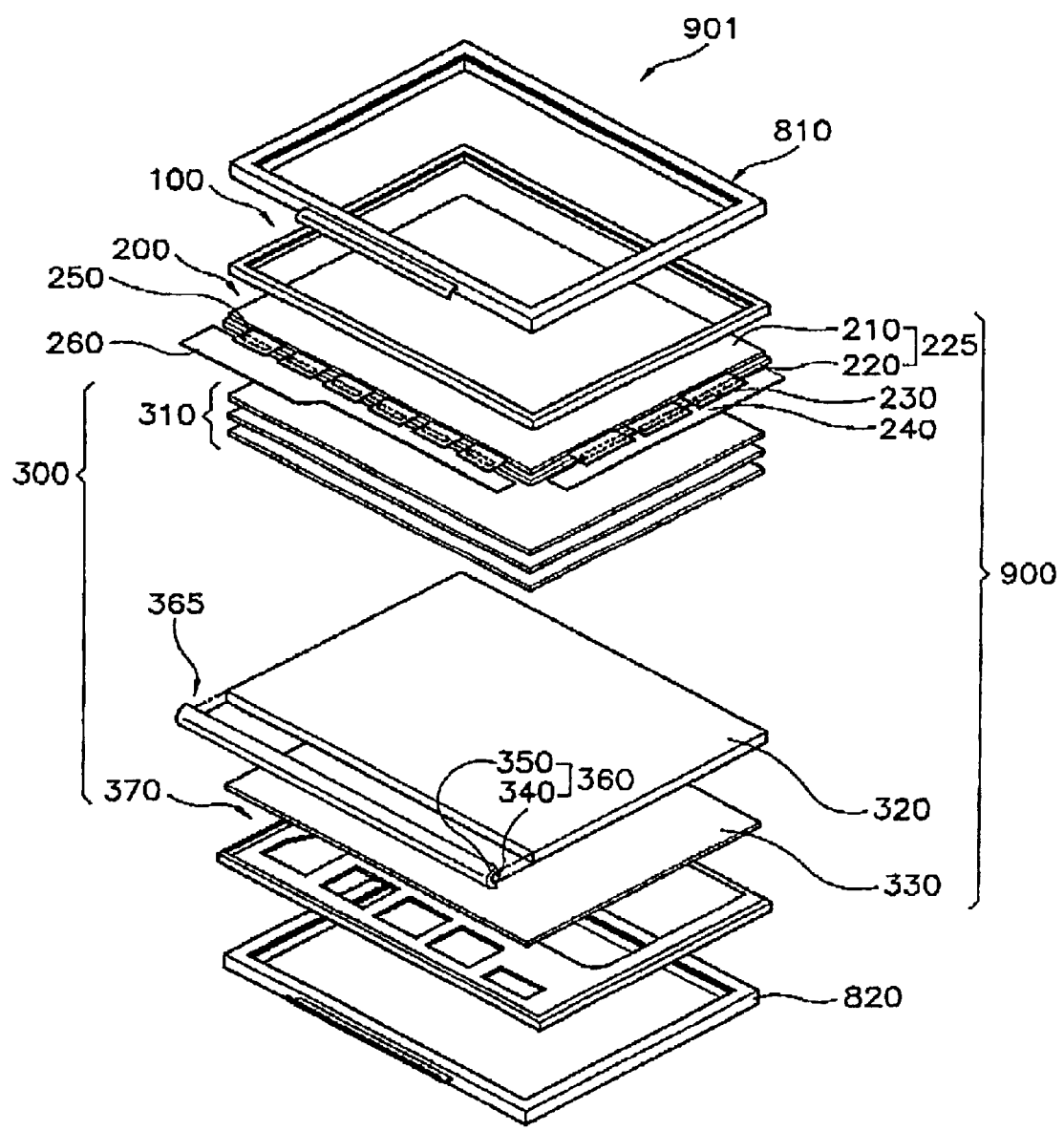
FIG. 2 is an exploded perspective view of an LCD in which a heat shielding film is applied according to one embodiment of the present invention.

FIG. 2 is an exploded perspective view of an LCD in which a heat shielding film is applied according to one embodiment of the present invention.

Referring to FIG. 2, an LCD 901 includes cases 810, 820 and an LCD module 900. The cases 810, 820 protect a front and rear surface of the LCD module 900. Each of the cases 810, 820 is comprised of a rear case 820 for protecting the rear surface of the LCD module 900, and for providing a receiving space in which the LCD module 900 is received, and a front case 810, which is coupled with the rear case 820 and has an opening for defining an effective display region of the LCD module 900.

Meanwhile, the LCD module 900 coupled to the cases 810, 820 receives a video signal input from an external data processing unit (not shown) and displays an image.

To realize this, the LCD module 900 has to compositively perform a first function of precisely controlling an aligning angle of a liquid crystal injected between two electrodes and changing a light transmissivity of the liquid crystal in a unit of a fine surface area, and a second function of supplying light passing through the liquid crystal that is aligned to change the light transmissivity.

An LCD assembly 200 of the LCD module 900 realizes the first function of changing the light transmissivity of the liquid crystal in the unit of the fine surface area. The LCD assembly 200 includes an LCD panel comprising a thin film transistor (TFT) substrate 220, a color filter substrate 210 facing the TFT substrate 220, and a liquid crystal (not shown) interposed between the TFT substrate 220, and the color filter substrate 210, and a control module 230, 240, 250, 260 for controlling the liquid crystal of the LCD panel 225. Reference numeral 100 is top chassis.

The TFT substrate 220 changes a voltage in the unit of fine surface area depending on video signals externally applied. The color filter substrate 210 serves as an electrode and, at the same time, functions to filter white light and generate one of three primary colored lights.

In other words, in order to change the voltage in the unit of the fine surface area at the TFT substrate 220, it is most advantageous that the TFTs, as a switching device, having a gate electrode, a source electrode and a drain electrode (not shown), are aligned on a transparent substrate in a matrix configuration, the drains of the respective TFTs being respectively connected to corresponding transparent pixel electrodes. This method can selectively operate a particular TFT in such a state that the TFTs are formed on the transparent substrate, and power is supplied only to the transparent electrode of the corresponding TFT.

If the power is selectively supplied only to the transparent electrode of the corresponding TFT due to the operation of the particular TFT, an electric field is formed between the color filter substrate 210 and the transparent electrode to which the power is supplied. As a result, an alignment of the liquid crystal is changed according to the intensity of the electric field.

Meanwhile, the LCD panel 225 serves as hardware for displaying an image. The control modules 230, 240, 250, 260, which serve as software for operating the hardware, are necessary to precisely display the desired Image. Further, the control modules 230, 240, 250, 260 function to decide the intensity of the electric field supplied to each TFT and the timing for operating the TFT, and include a gate printed circuit board 240, a source printed circuit board 260, and a flexible printed circuit 230, 250.

In order to reciprocally operate the LCD panel 225 and the control modules 230, 240, 250, 260 having the construction as described above, gate electrodes included in each column of the TFTs aligned in the matrix configuration on the TFT substrate 220 are connected to each other through a common gate line. Source electrodes included in each row of the TFT aligned in the configuration of the matrix are also connected to each other through a common data line.

Then, the gate printed circuit board 240 is connected to each gate line to sequentially apply an operating signal to gate lines. The source printed circuit board 260 is connected to each data line to supply the power corresponding to the video signal to each data line.

The flexible printed circuits 230 and 250 are connected between the gate printed circuit board 240 and the gate line and between the source printed circuit board 260 and the data line. Due to the use of the flexible printed circuits 230 and 250, the gate printed circuit board 240 and the source printed circuit board 260 can be bent toward a rear surface of a receiving container to be described below, thereby reducing the volume of the LCD.

However, although the control modules 230, 240, 250 and 260, and the LCD panel 225 of the LCD panel assembly 200, having a complicated construction, are precisely operated, a desired character, image and moving picture is not displayed in a location that does not have enough amount of light. This is because the liquid crystal of the LCD panel 225 does not emit light by itself. The liquid crystal functions only to control the light transmittance according to the intensity of the electric field Therefore, in order to perform a displaying operation at the LCD panel assembly 200, the light has to be supplied to the LCD panel assembly 200 by alternate means.

Natural light may be used in the LCD panel assembly 200. However, since the displaying operation cannot be performed in a dark place, the light generated by electric energy is mainly used in the LCD panel assembly 200. A backlight assembly 300 realizes this function.

Figure 3A:
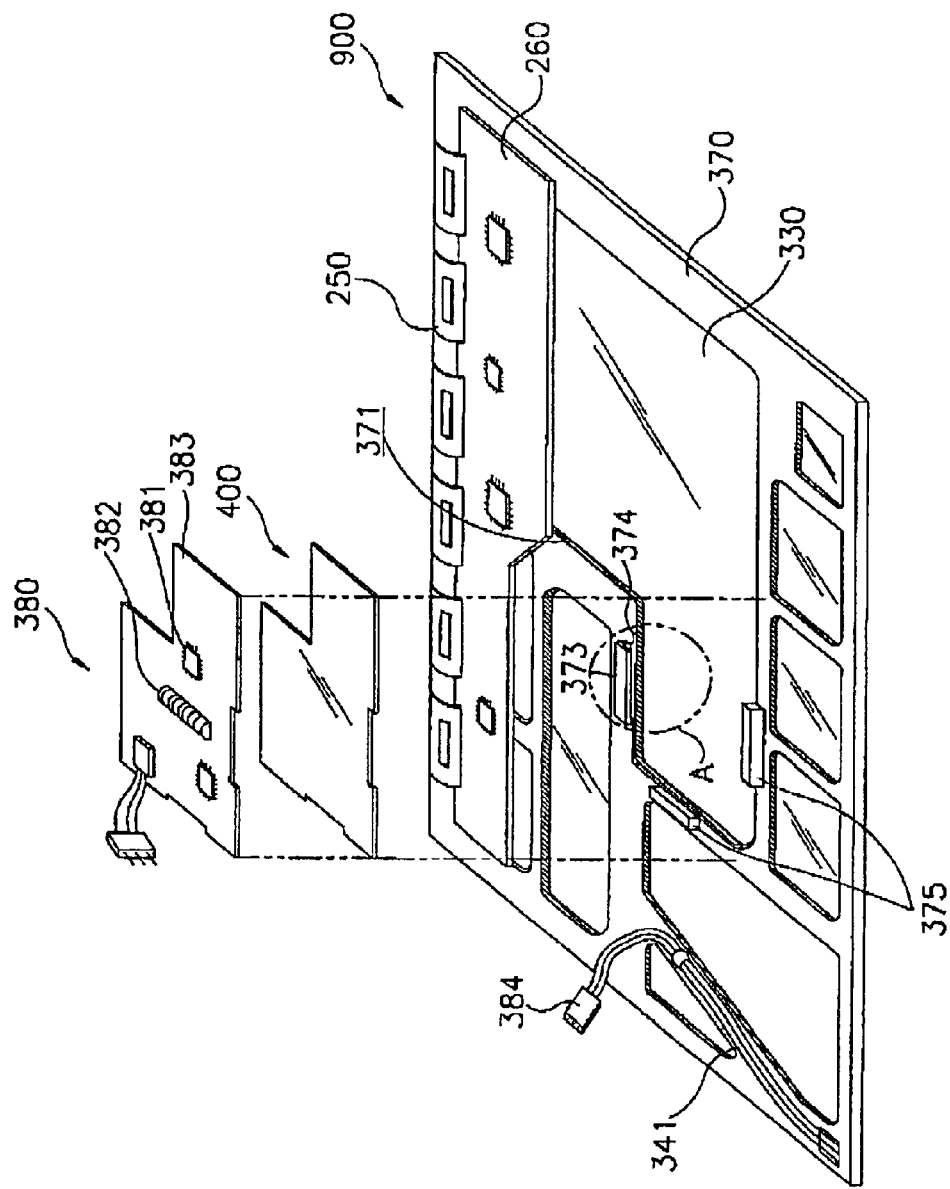
FIG. 3A is a rear perspective view showing a state in which the heat shielding film for the LCD is mounted, on a rear face of the LCD according to an embodiment of the present invention.

The backlight assembly 300 generates the light and also functions to obtain a uniform distribution of the light. The backlight assembly 300 includes a light generating unit 365, light uniformity-enhancing units 310, 320, 330 and a receiving container 370. The light generating unit 365 includes a lamp assembly 360 and an inverter module (FIG. 3A, 380). The lamp assembly 360 includes a lamp 340 and a lamp cover 350.

Also, a CCFL (cold cathode fluorescent lamp) type lamp 340 is mainly used as the lamp 340. The CCFL type lamp 340 has a longer life span, and irradiates white light similar to natural light, and also generates less amount of heat when driving the lamp. Meanwhile, since the CCFL type lamp 340 has various advantages, but needs a very high driving voltage, the inverter module 380 is used for boosting a low voltage to a high voltage, as shown in FIG. 3A. At the inverter module 380, are disposed a transformer for boosting a voltage and a plurality of integrated circuits The light uniformity-enhancing units 310, 320, 330 include an optical sheet 310, a light guiding plate 320 and a reflector panel 330 to improve a distribution of light generated from the lamp assembly 360.

The light guiding plate 320 functions to transform the light having a distribution of linear light source and generated from the CCFL type lamp 340 into the light having a distribution of a planar light source, and, at the same time, to change a direction of the light. At this time, the light guiding plate 320 is formed in the shape of a wedge in which its thickness is gradually reduced from one end toward the other end thereof or in the shape of a flat plate in which its thickness is not changed.

The reflector panel 330 is formed in a plate shape having a high reflectivity, and it is disposed at a lower surface of the light guiding plate 320 so as to regenerate light leaking from the light guiding plate 320. On an upper face of the light guiding plate 320, there are provided the optical sheets 310 functioning to diffuse and collect the light irradiated from the light guiding plate 320.

The light generating unit 365 and the light uniformity-enhancing units 310, 320, 330 having constructions, as described above, are received in the receiving container 370 according to a predetermined order.

Referring to FIG. 2 or FIG. 3A, the receiving container 370 has an internal space having a desired surface area to receive both the light-generating unit 365 and the light uniformity-enhancing units 310, 320, 330. Particularly, in order to reduce weight of the receiving container 370, a portion of a bottom surface of the receiving container 370 is removed within an area that does not exert an influence on strength of the receiving container 370 to form a plurality of openings 371 (see FIG. 3A).

On the bottom surface of the receiving container 370, there are stacked the reflector panel 330, the light guiding plate 320, the lamp assembly 360, the optical sheets 310 and the LCD panel assembly 200 In this situation, with reference to FIG. 3A, at an outer surface of the receiving container 370 is disposed the inverter module 380 for supplying power to the CCFL type lamp 340.

A heat shielding film 400 is interposed between the inverter module 380 and the outer surface of the receiving container 370. Moreover, the inverter module 380 includes a printed circuit board 383, a transformer 382 disposed on the printed circuit board 383 to boost a voltage, and a plurality of integrated circuits 381. A reference numeral 384 designates a connector through which the boosted voltage is output.

As described above, the inverter module 380 is disposed at the outer surface of the receiving container 370. Thus, in order to exactly dispose the inverter module 380 at a desired portion of the outer surface of the receiving container 370, for example, there are provided a latching protrusion 373 and a stopper 375.

Figure 3B:
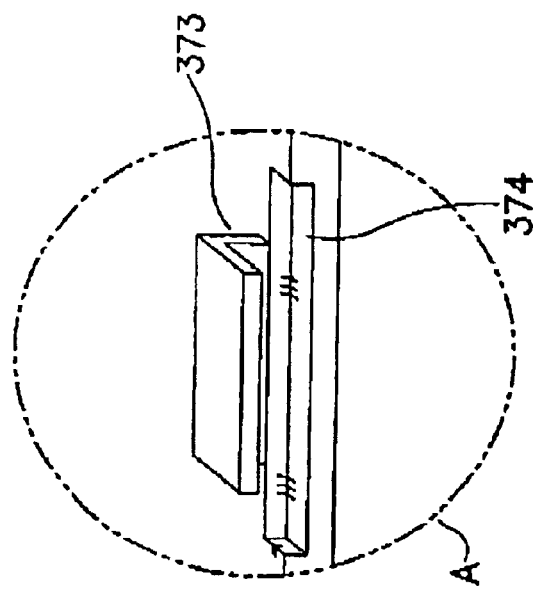
FIG. 3B is a partially enlarged view of an "A" portion of FIG. 3A.

As shown in FIGS. 3A and 3B, an edge portion of the printed circuit board 383 of the inverter module 380 is latched to the latching protrusion 373 to restrict an up and down movement of the inverter module 380. The stopper 376 functions to restrict a horizontal movement of the inverter module 380 latched to the latching protrusion 373.

Figure 4A:
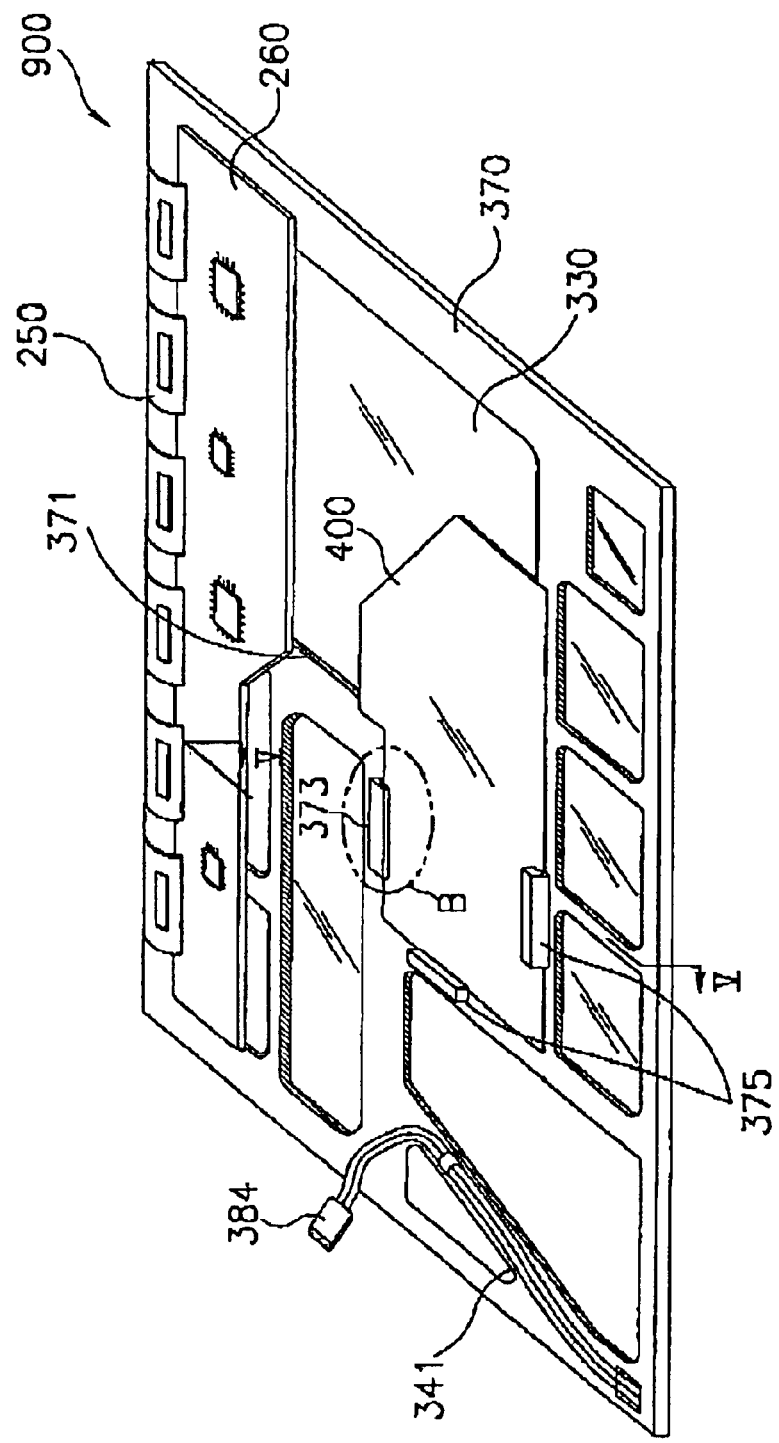
FIG. 4A is a rear perspective view of the heat shielding film disposed at a desired position of the LCD according to an embodiment of the present invention.

Before arranging the inverter module 380, as shown in FIG. 4A, the heat shielding film 400 shields heat generated from the inverter module 380 (not shown in FIG. 4A, see FIG. 3A) during the boosting of the lamp driving voltage, and then rapidly discharges and blocks the heat, thereby preventing the heat from being transferred to the light uniformity-enhancing units 310, 320, 330 as well as preventing EMI (electromagnetic interference). Reference numeral 341 shown in FIG. 3A and FIG. 4A is lamp wire.

Figure 4B:
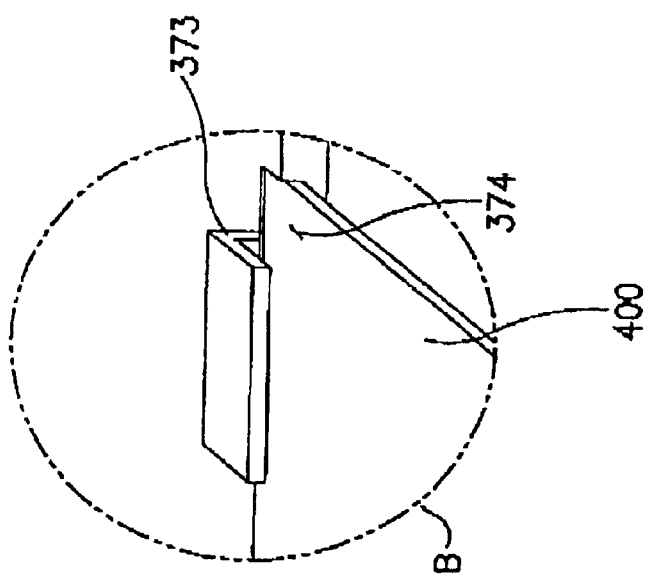
FIG. 4B is a perspective view of the heat shielding film of which a surface area is formed to be larger than that of an inverter module.

Also, as shown in FIG. 4B, the heat shielding film 400 has a surface area larger than the inverter module 380 but smaller than an entire surface area of the receiving container 370. Preferably, in consideration of the aspects of heat shielding effect, weight and thickness, the heat shielding film 400 has the surface area about twice as large as that of the inverter module 380.

Figure 5:
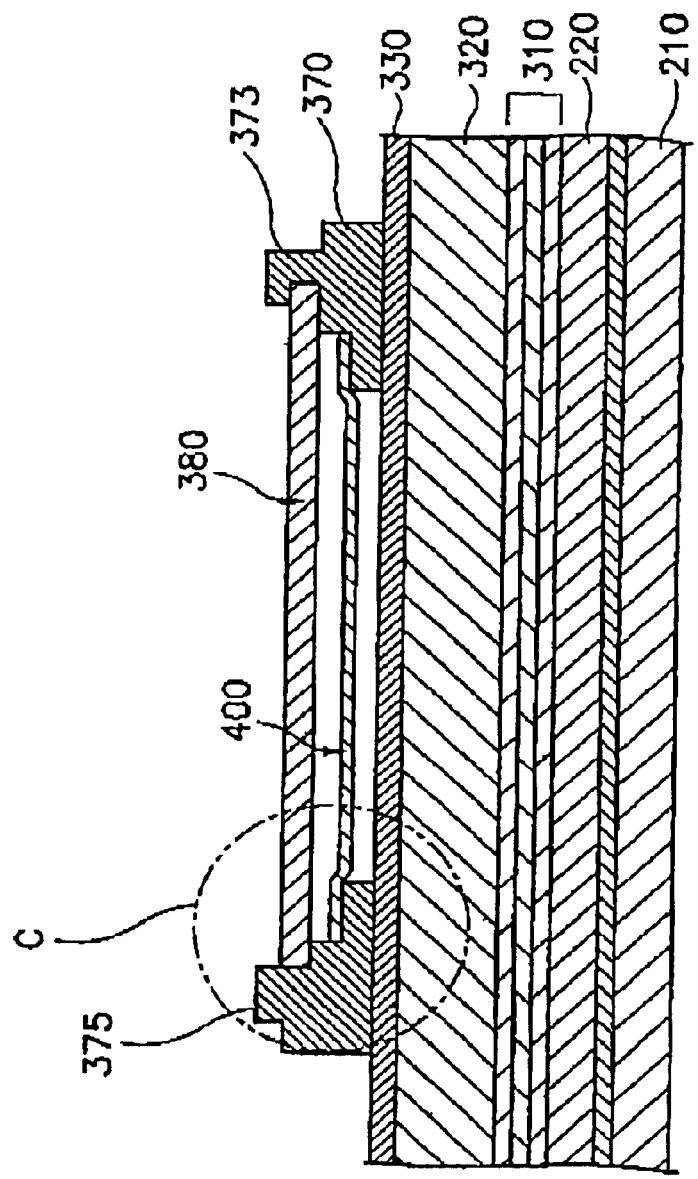
FIG. 5 is a cross-sectional view taken along the line V—V of FIG. 4A.

Further, the heat shielding film 400, as shown in FIG. 5, is formed apart from a lower surface of the inverter module 380 and from the reflector panel 330, at a desired distance.

Alternatively, the heat shielding film 400 is closely contacted with the inverter module 380 while the reflector panel 330 is apart from the inverter module 380 at a distance, or is closely contacted with the reflector panel 330 while being apart from the inverter module 380 at the same distance.

Here, the heat shielding film 400 is set apart from the inverter module 380 and the reflector panel 330 in order to prevent the conduction of the heat generated from the inverter module 380, taking advantage of the fact that air itself has very low heat conductivity. The air in the airtight space hardly flows.

The heat shielding film 400 may be formed by various embodiments. However, in the present invention, the heat shielding film 400 is provided in the forms of three preferable embodiments.

Figure 6:
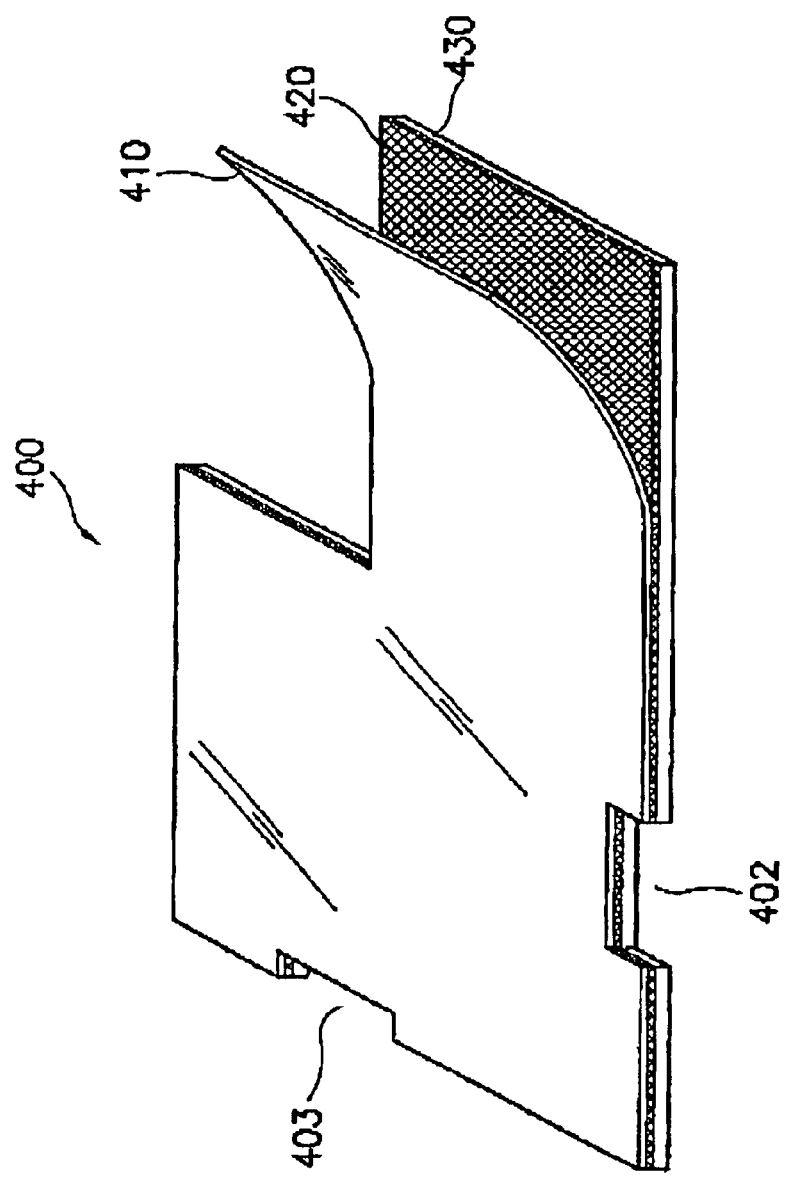
FIG. 6 is a perspective view showing a structure of the heat shielding film for the LCD according to an embodiment of the present invention.
Figure 7:
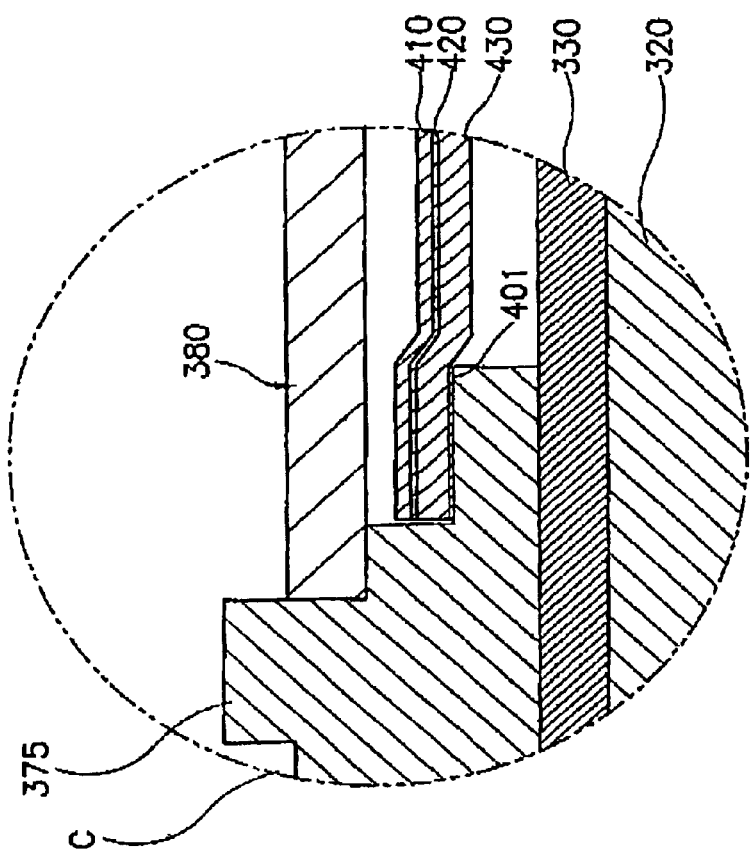
FIG. 7 is a cross-sectional view, of an enlarged portion of "C" from FIG. 5, showing a profile line in a state in which the heat shielding film shown in FIG. 6 is applied.

FIG. 6 is a first embodiment of the heat shielding film 400 according to the present invention, and FIG. 7 is another embodiment, depicting an enlarged portion "C" from FIG. 5, showing a state that the heat shielding film 400 is applied to an LCD.

Referring to FIG. 6 or FIG. 7, the heat shielding film 400 has three or more layers. Hereinafter, the three layers are called a first shielding layer 410, an adhesive layer 420 and a second shielding layer 430.

Referring to FIG. 6, the first shielding layer 410 is comprised of an aluminum alloy or aluminum material having high heat conductivity and has a thin film structure, preferably having a thickness of about 0.1 mm. The first shielding layer 410 has a slightly larger surface area than the inverter module 380 while having a similar shape to the inverter module 380.

An adhesive having relatively low heat conductivity is entirely coated on a side of the first shielding layer 410 to form the adhesive layer 420. On an upper surface of the adhesive layer 420, there is bonded the second shielding layer 430 having a thickness of, preferably, about 0.15 mm, which is slightly larger than that of the first shielding layer 410, and has a similar shape to the first shielding layer 410. Reference numerals 402 and 403, as shown in FIG. 6, designate stopper grooves to which the stopper 375 is coupled.

Figure 8:
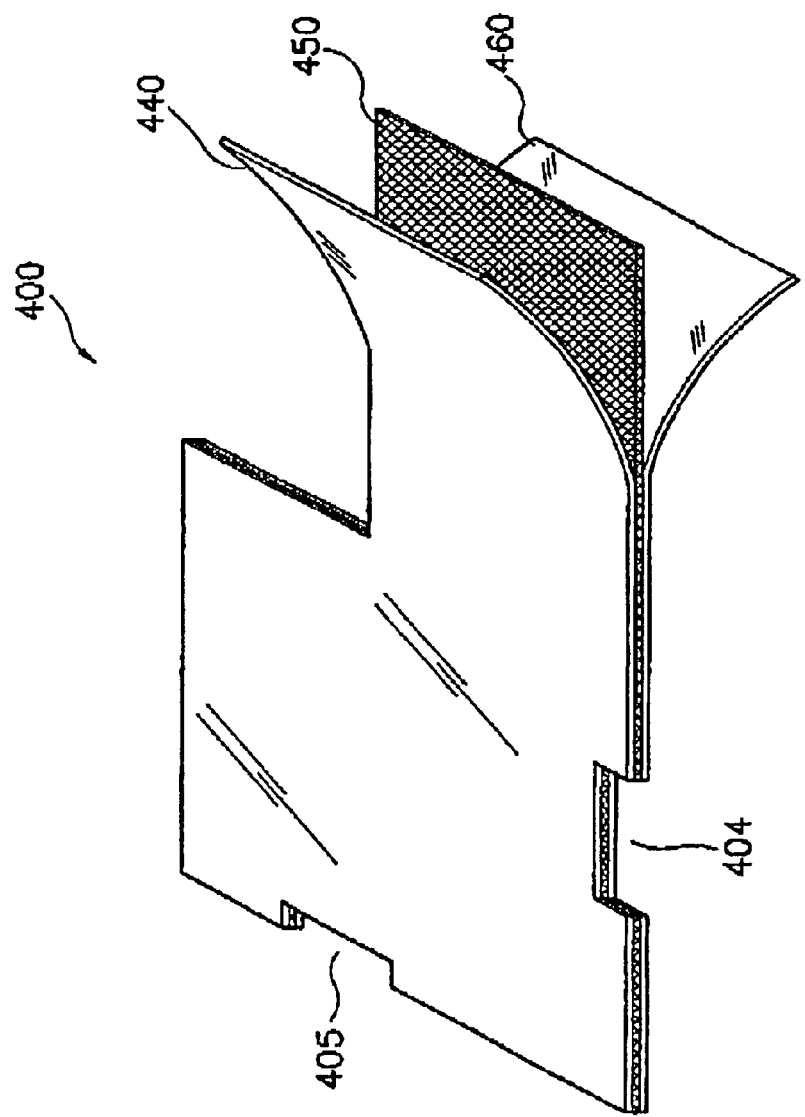
FIG. 8 is a perspective view, of an enlarged portion "C" from FIG. 6, showing a construction of the heat shielding film according to another embodiment of the present invention.
Figure 9:
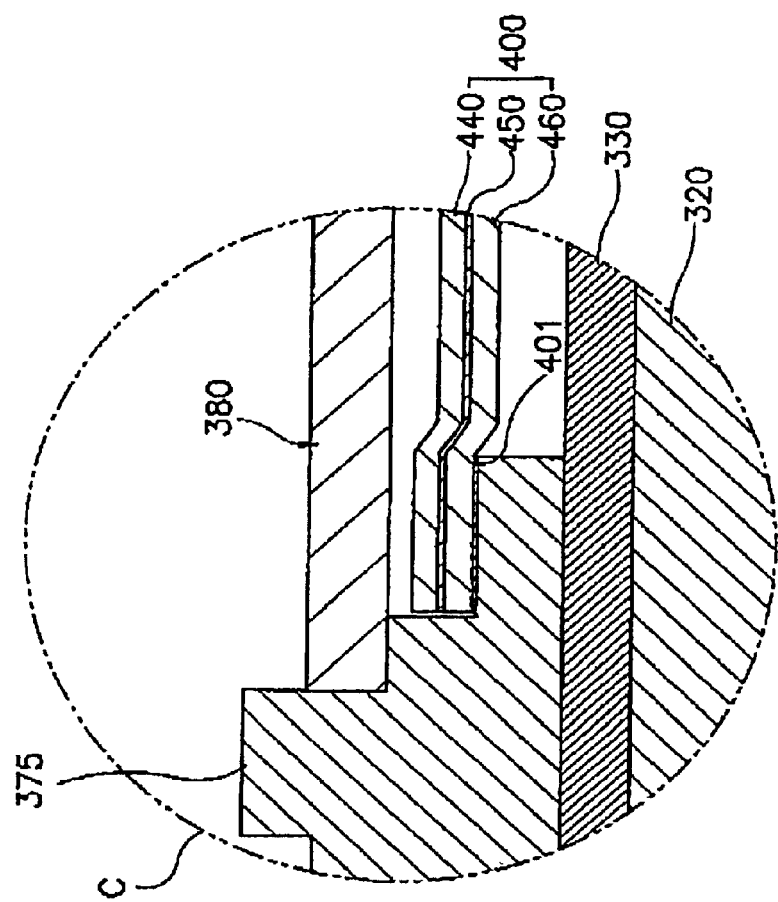
FIG. 9 is a cross-sectional view showing a profile line in a state to which the heat shielding film shown in FIG. 8 is applied.

FIGS. 8 and 9 show a second embodiment of the present invention.

Referring to FIG. 8, the heat shielding film 400 of the embodiment also is comprised of three or more layers. A first shielding layer 440 is comprised of an aluminum thin film having high heat conductivity and, preferably, a thickness of about 0.1 mm. The first shielding layer 440 has a slightly larger surface area than the inverter module 380 while having a similar shape to the inverter module 380.

An adhesives having lower heat conductivity is entirely coated on a Side of the first shielding layer 440 to form the adhesive layer 450. On an upper surface of the adhesive layer 450, there is bonded a second shielding layer 460 having a thickness, preferably, of about 0.1 mm, which is the same as that of the first shielding layer 440, and has a similar shape to the first shielding layer 440. The second shielding layer 460 and a short jaw portion 374 are bonded to each other by a double-faced adhesive tape 401 attached along an edge of the second shielding layer 460. Reference numerals 404, 405, as shown in FIG. 8, designate stopper grooves to which a stopper 375 is coupled.

Figure 10:
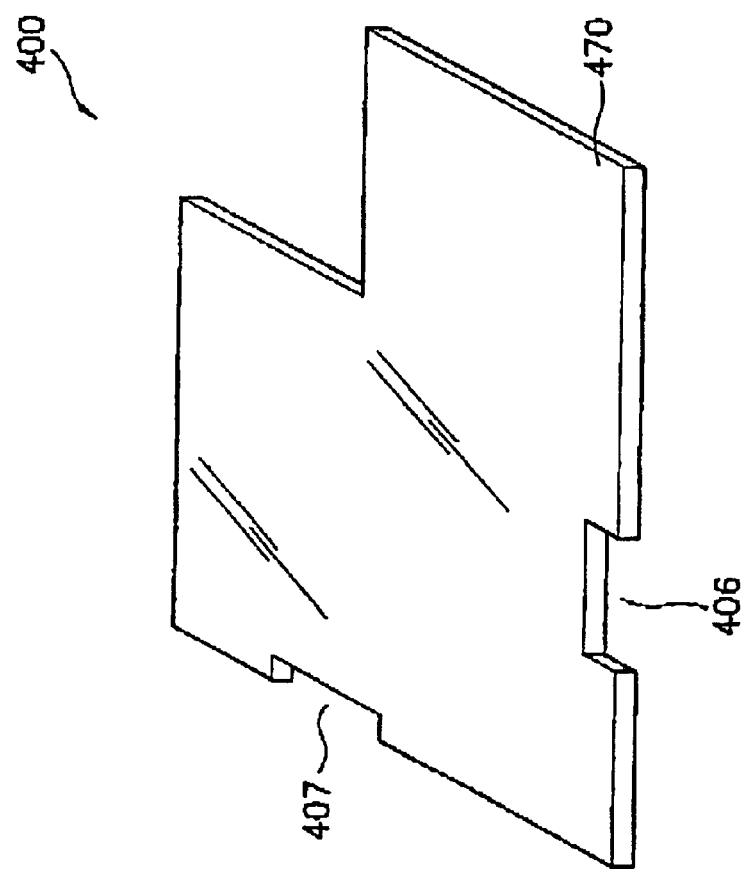
FIG. 10 is a perspective view showing a construction of the heat shielding film according to yet another embodiment of the present invention.
Figure 11:
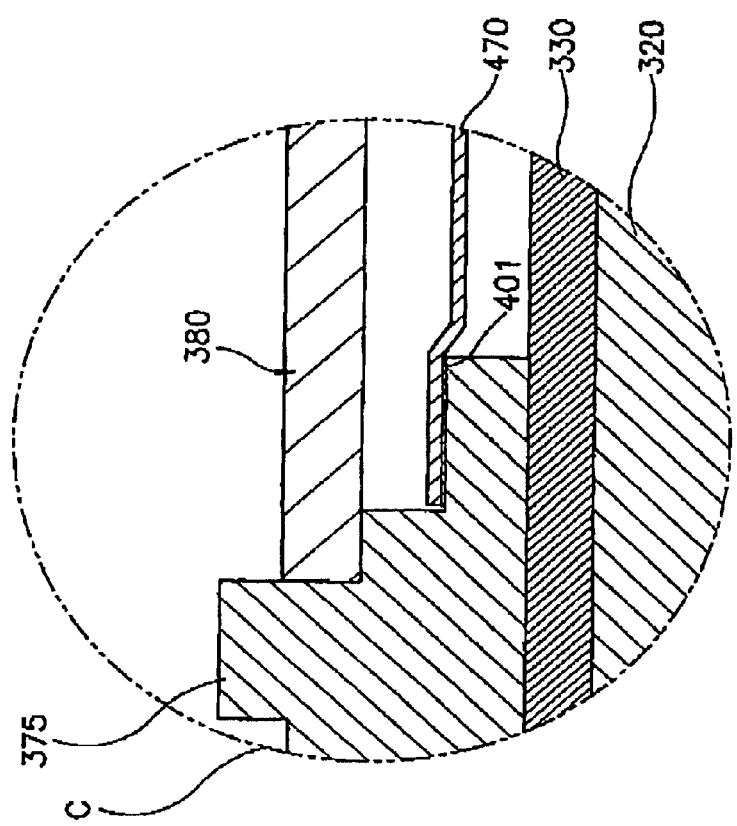
FIG. 11 is a cross-sectional view showing a profile line in a state to which the heat shielding film shown in FIG. 10 is applied.

FIGS. 10 and 11 show a third embodiment of the present invention.

Referring to FIG. 10, the heat shielding film 400 of the embodiment is comprised of a single shielding layer 470. That is, the shielding layer 470 has a similar shape to the inverter module 380. A planar surface area of the shielding layer 470 is slightly larger than that of the inverter module 380 to rapidly discharge the heat generated from the inverter module 380. The shielding layer 470 and the short jaw portion 374 are bonded to each other by a double-faced adhesive tape 401 attached along an edge of the shielding layer 470. Reference numerals 406, 407 designate stopper grooves to which a stopper 375 is coupled.

TABLE 1

| Items | Transformer Temperature | Integrated Circuit Temperature |
| --- | --- | --- |
| Temperature of a bottom surface of inverter module 380 | 47.7° C. | 43.1° C. |
| Comparison example | 44.0° C. | 42.7° C. |
| First experiment | 35.1° C. | 33.5° C. |
| Second experiment | 38.8° C. | 36.6° C. |
| Third experiment | 38.5° C. | 36.0° C. |

Table 1 above shows an experimental result in each case that the heat shielding films of each embodiment discussed above were applied as compared to the case where the heat shielding film was not applied.

As a result of measuring a temperature at a bottom surface of the printed circuit board 383 of the inverter module 380, corresponding to the transformer portion and the integrated circuit portion, which are a main heat source of the inverter module, the temperature of the transformer portion was 47.7° C., and the temperature of the integrated circuit portion was 43.1° C.

The "comparison example" is an experimental result in a case that the heat shielding film was not applied to the inverter module. Each temperature was measured at a surface of the reflector panel 330, on which the heat directly exerts damage. The surface temperature of the reflector panel 330 corresponding to the transformer of the inverter module 380 was 44.0° C. The surface temperature of the reflector panel 330 corresponding to the integrated circuit was 42.7° C. It can be shown that the temperature corresponding to the transformer portion and the integrated circuit was approximately the same as that of the bottom surface of the inverter module 380.

Meanwhile, in the "first experiment", the surface temperature of the reflector panel 300 was measured in a state corresponding to the heat shielding film of the first embodiment of FIG. 6, consisting of the first shielding layer of, preferably, 0.1 mm thickness, and the adhesive layer and the second shielding layer of, preferably, 0.15 mm thickness, was interposed between the inverter module 380 and the receiving container 370. As a result, the surface temperature of the reflector panel 330 corresponding to the transformer of the inverter module 380 was 35.1° C. The surface temperature of the reflector panel 330 corresponding to the integrated circuit was 33.5° C. Therefore, the surface temperature was remarkably reduced relative to the "comparison example".

In the second experiment, the surface temperature of the reflector panel 300 was measured in a state corresponding to the heat shielding film of the second embodiment of FIG. 8, consisting of the first shielding layer of, preferably, 0.1 mm thickness, the adhesive layer and the second shielding layer of, preferably, 0.1 mm thickness, is interposed between the inverter module 380 and the receiving container 370. As a result, the surface temperature of the reflector panel 330 corresponding to the transformer of the inverter module 380 was 38.8° C. The surface temperature of the reflector panel 330 corresponding to the integrated circuit was 36.6° C. Therefore, the surface temperature was also remarkably reduced relative to the "comparison example".

In the third experiment, the surface temperature of the reflector panel 330 was measured in a state corresponding to the heat shielding film of the third embodiment of FIG. 10, consisting of the single shielding layer of, preferably, 0.3 mm thickness, interposed between the inverter module 380 and the receiving container 470. As a result, the surface temperature of the reflector panel 330 corresponding to the transformer of the inverter module 380 was 38.5° C. The surface temperature of the reflector panel 330 corresponding to the integrated circuit was 36.0° C. Again, this demonstrates a significant reduction in temperature relative to the "comparison example".

In the third experiment, the heat shielding film 400 is interposed between the reflector panel 330 and a lower portion of the printed circuit board 383 of the inverter module 380. Therefore, the heat generated from the transformer and the integrated circuit of the inverter module 380 is prevented from being transferred to the reflector panel 330, thereby maximizing an insulation effect.

In addition, the heat generated from the transformer and the integrated circuit of the inverter module 380 is discharged within a short time so as to minimize the temperature of the reflector panel 330 so that the reflector panel 330 is not deformed, thereby preventing a deformation of the reflector pannel 330 and a characteristic degeneration of the light guiding plate 320, the optical sheets 210 and the LCD panel assembly 200 due to the heat.

Moreover, for example, in the case where two aluminum thin films having high heat conductivity are attached to both sides of the adhesive layer, the adhesive layer blocks a flow of the heat, thereby efficiently reducing the surface temperature of the reflector panel 330. Further, if the two aluminum thin films having high heat conductivity are attached to both sides of the adhesive layer, and one of the aluminum thin films is formed to be thicker than the other, the surface temperature of the reflector panel 330 can be reduced even more.

Figure 12:
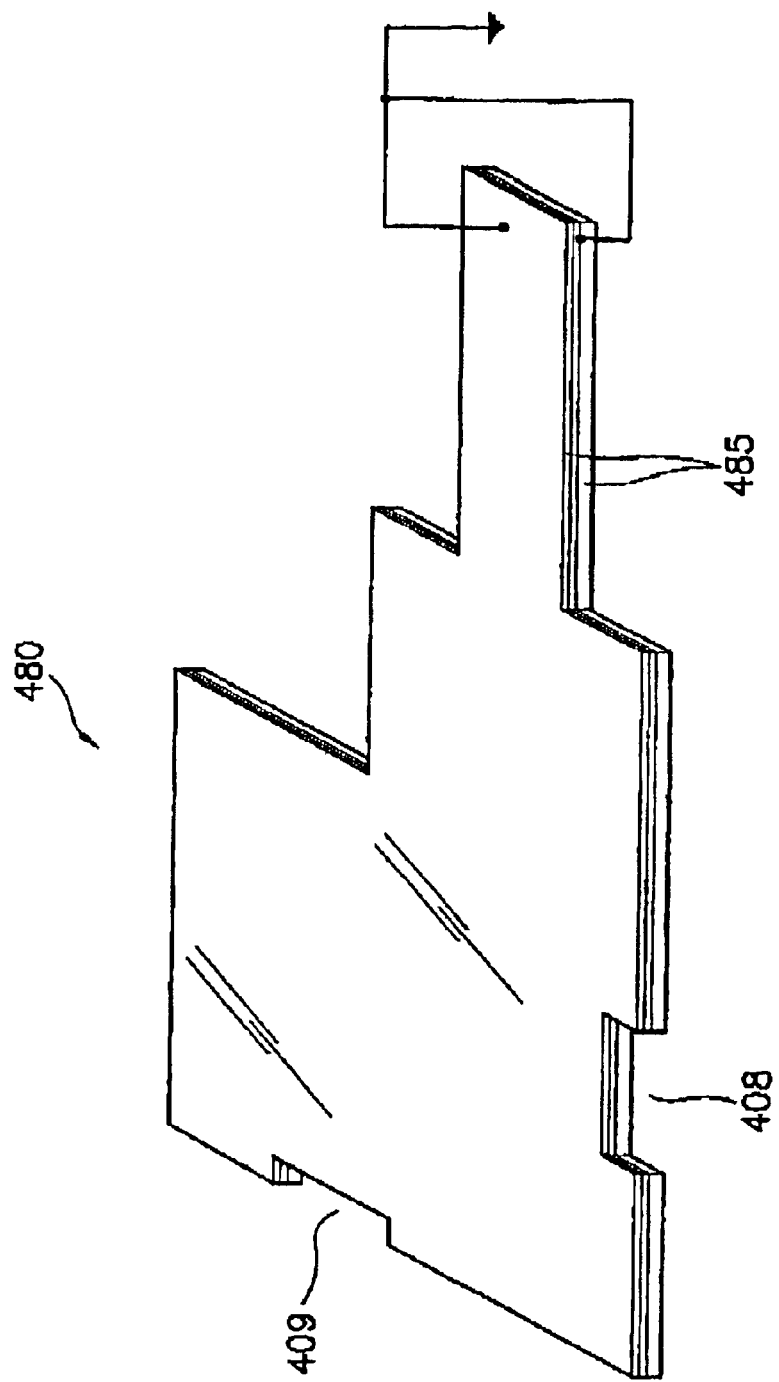
FIG. 12 is a perspective view showing a construction of the heat shielding film with a ground function according to yet another embodiment of the present invention.

FIG. 12 shows another embodiment of the present invention. In the embodiment, in considering that a heat shielding film 480 is formed of a conductive thin film having a high conductivity, a portion of the heat shielding film 480 is elongatively extended to form a ground piece 485 in a state that the heat shielding film 480 and the inverter are electrically connected to each other using a conductive screw, etc., and then the ground piece 485 is grounded to the ground line, thereby eliminating various electric noise generated in the inverter module 480 and the leaking current as well as static electricity generated in the reflector panel 330 Reference numerals 408 and 409 designate stopper grooves to which a stopper 375 is coupled.

According to the present invention, the reflector panel is prevented from becoming partially deformed by the excessive heat generated from the inverter module for driving the lamp, thereby also preventing a degeneration of a displaying performance and obtaining high displaying performance.

Moreover, the characteristic degeneration of the light guiding plate, the optical sheets and the liquid crystal are prevented, thereby improving a high quality of displaying characteristic.

Further, according to the present invention, the heat generated from the inverter module is efficiently blocked, and the leakage current and the static electricity generated from the inverter module are grounded, and also the static electricity generated in the reflector panel is eliminated.

In the specification, there are described only a few embodiments in order to explain a technical definition of the present invention. For example, there are described the single heat shielding film and the heat shielding film in which two metal thin films are attached. However, in the case where there are provided two or more metal thin films, and the metal thin films are bonded to each other by an adhesive, the heat shielding effect is further increased. In addition, as yet another embodiment of the present invention, if the heat shielding film is formed with periodical irregular portions or waves to increase a surface area for discharging the heat, the temperature of the reflector panel is also decreased While the present invention has been described in detail herein, it should be understood that various changes, substitutions and alterations can be made hereto without departing from the spirit and scope of the invention as defined by the appended claims.

What is claimed is:

1. A liquid crystal display (LCD) device, comprising:
   an LCD panel assembly for controlling a liquid crystal to display an image;
   a backlight assembly provided with a lamp assembly for supplying light to the LCD panel assembly and a light uniformity-enhancing module for improving uniformity of the light generated from the lamp assembly;
   a receiving container for receiving and fixing the LCD panel assembly and the backlight assembly;
   an inverter disposed at an outer surface of the receiving container to supply power needed to drive the lamp assembly; and
   a heat shielding unit disposed at the receiving container corresponding to a portion between the inverter and the light uniformity-enhancing module so as to shield heat generated from the inverter and to reduce heat transmission to the light uniformity-enhancing module.

2. The LCD of claim 1, wherein the heat shielding unit comprises a conductive plate.

3. The LCD of claim 2, wherein the heat shielding unit comprises aluminum.

4. The LCD of claim 2, wherein the heat shielding unit comprises a first metal thin film bonded to a second metal thin film by an adhesive material.

5. The LCD of claim 4, wherein the first metal thin and the second metal thin film have different thicknesses.

6. The LCD of claim 5, wherein the first metal thin film is adjacent to the backlight assembly and is thicker than a second film of the metal thin films.

7. The LCD of claim 1, wherein the heat shielding unit has a greater surface area than a surface area of the inverter.

8. The LCD of claim 7, wherein the heat shielding unit has a surface area that is about twice as large as a surface area of the inverter.

9. The LCD of claim 1, wherein an opening is formed at an outer surface of the receiving container, the opening corresponding to a location at which the heat shielding unit is mounted, the opening being smaller than the heat shielding unit, and a short jaw on which the heat shielding unit is mounted, is formed at an edge of the opening so that at least one of the backlight assembly and the inverter is part from the heat shielding unit at a desired distance.

10. The LCD of claim 1, wherein the heat shielding unit substantially prevents the heat generated from the inverter from being transferred to a reflector panel of the backlight assembly and thus deformation of the reflector panel is substantially prevented.

11. The LCD of claim 1, wherein the heat shielding unit comprises an embossed portion to increase a surface area thereof.

12. The LCD of claim 1, wherein the heat shielding unit comprises a wrinkled portion to increase a surface area thereof.

13. A liquid crystal display (LCD), comprising:
an LCD panel assembly for controlling a liquid crystal to display an image;
a backlight assembly provided with a lamp assembly for supplying light to the LCD panel assembly, and a light uniformity-enhancing module for improving uniformity of light generated from the lamp assembly;
a receiving container for receiving and fixing the LCD panel assembly and the backlight assembly;
a conductive chassis for preventing the LCD panel assembly from being separated to an outside;
an inverter disposed at an outer surface of the receiving container to supply power necessary to drive the lamp assembly;
a heat shielding unit which shields heat generated from the inverter and reduces heat transmission to the light uniformity-enhancing module; and
a ground member for electrically connecting the inverter and the heat shielding unit.

14. The LCD of claim 13, wherein a portion of the heat shielding unit extends to be electrically connected to the conductive chassis.

15. A display, comprising:
a receiving container;
an display panel arranged within the receiving container;
a backlight assembly including a lamp assembly to supply light to the display panel assembly arranged within the receiving container;
an inverter arranged on a surface of the receiving container, the inverter supplies power necessary to power the lamp assembly; and
a heat shielding unit arranged between the inverter and the backlight assembly.

16. The display of claim 15, wherein the display panel is a liquid crystal display (LCD) panel.

17. The display of claim 15, wherein the heat shielding unit comprises a first shielding layer, an adhesion layer, and a second shielding layer.

18. The display of claim 17, wherein the first shielding layer includes aluminum.

19. The display of claim 17, wherein the first shielding layer has a similar shape to that of the inverter.

20. The display of claim 15, wherein the heat shielding unit comprises a single sheet formed of a highly conductive material.

21. The LCD of claim 1, wherein the heat shielding unit blocks the heat.

22. The LCD of claim 1, wherein the heat shielding unit blocks electromagnetic radiation from the inverter.

23. The LCD of claim 1, wherein the heat shielding unit discharges the heat.

24. The LCD of claim 13, wherein the heat shielding unit blocks the heat.

25. The LCD of claim 13, wherein the heat shielding unit blocks electromagnetic radiation from the inverter.

26. The LCD of claim 13, wherein the heat shielding unit discharges the heat.

27. The LCD of claim 13, wherein the heat shielding unit is disposed between the inverter and the light uniformity-enhancing module.

* * * * *